US009369434B2

(12) United States Patent
Kim et al.

(10) Patent No.: US 9,369,434 B2
(45) Date of Patent: Jun. 14, 2016

(54) WHITELIST-BASED NETWORK SWITCH

(71) Applicant: ELECTRONICS AND TELECOMMUNICATIONS RESEARCH INSTITUTE, Daejeon (KR)

(72) Inventors: Heemin Kim, Daejeon (KR); Jeong-Han Yun, Daejeon (KR); Kyoung-Ho Kim, Gokseong-gun (KR); Woonyon Kim, Daejeon (KR); Jungtaek Seo, Daejeon (KR); Chun soo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/330,141

(22) Filed: Jul. 14, 2014

(65) Prior Publication Data

US 2015/0067764 A1  Mar. 5, 2015

(30) Foreign Application Priority Data

Sep. 3, 2013  (KR) .................. 10-2013-0105326

(51) Int. Cl.
*H04L 29/06*  (2006.01)
(52) U.S. Cl.
CPC .......... *H04L 63/0227* (2013.01); *H04L 63/101* (2013.01)
(58) Field of Classification Search
CPC ... H04L 63/101; H04L 63/0277; H04L 63/08; H04L 63/1524; H04L 63/20; H04L 63/10; H04L 63/1408; G06F 21/60; G06F 21/606

USPC ............................................. 726/1
See application file for complete search history.

(56) References Cited

U.S. PATENT DOCUMENTS

| 7,246,370 | B2* | 7/2007 | Valente ................. G06F 21/50 726/1 |
| 7,571,325 | B1* | 8/2009 | Cooley ................ H04L 63/101 713/181 |
| 7,574,202 | B1* | 8/2009 | Tsao et al. ................... 455/411 |
| 7,617,533 | B1* | 11/2009 | Hernacki ..................... 726/22 |
| 7,783,735 | B1* | 8/2010 | Sebes et al. .................. 709/223 |
| 7,917,647 | B2* | 3/2011 | Cooper .............. H04L 12/2602 370/229 |

(Continued)

FOREIGN PATENT DOCUMENTS

| JP | 2002-344530 A | 11/2002 |
| JP | 2004-289257 A | 10/2004 |

(Continued)

*Primary Examiner* — Hadi Armouche
*Assistant Examiner* — Shahriar Zarrineh
(74) *Attorney, Agent, or Firm* — LRK Patent Law Firm

(57) ABSTRACT

A whitelist-based network switch defines a whitelist and a handling rule based on an access control list, security policies, etc., and monitors and blocks network traffic based on the whitelist and the handling rule. The whitelist-based network switch includes a whitelist monitoring unit for storing a whitelist including permitted communication rules, monitoring one or more packets input through a plurality of switch interfaces based on the whitelist, and permitting communication of each packet conforming to the whitelist, and a whitelist management unit for updating the whitelist and transmitting an updated whitelist to the whitelist monitoring unit.

5 Claims, 3 Drawing Sheets

(56) References Cited

U.S. PATENT DOCUMENTS

| | | | |
|---|---|---|---|
| 9,042,263 B1* | 5/2015 | Yahalom | H04L 12/569 370/253 |
| 2002/0176426 A1 | 11/2002 | Asano et al. | |
| 2003/0182580 A1* | 9/2003 | Lee | 713/201 |
| 2004/0213237 A1 | 10/2004 | Yasue et al. | |
| 2005/0091537 A1* | 4/2005 | Nisbet | G06F 21/55 726/4 |
| 2005/0235352 A1* | 10/2005 | Staats | H04L 41/082 726/14 |
| 2006/0026680 A1* | 2/2006 | Zakas | H04L 29/06 726/22 |
| 2006/0120284 A1* | 6/2006 | Kim et al. | 370/230 |
| 2006/0167871 A1* | 7/2006 | Sorenson et al. | 707/6 |
| 2007/0011732 A1* | 1/2007 | Peng et al. | 726/11 |
| 2007/0067823 A1* | 3/2007 | Shim | H04L 63/101 726/2 |
| 2007/0083757 A1* | 4/2007 | Nakano et al. | 713/168 |
| 2007/0180109 A1* | 8/2007 | Brim | H04L 63/1433 709/225 |
| 2008/0134300 A1* | 6/2008 | Izatt | H04L 63/10 726/4 |
| 2008/0168558 A1* | 7/2008 | Kratzer | G06F 21/55 726/23 |
| 2008/0196099 A1* | 8/2008 | Shastri | 726/12 |
| 2009/0023431 A1* | 1/2009 | Sim | H04W 12/06 455/418 |
| 2009/0080436 A1* | 3/2009 | White | H04L 45/025 370/395.31 |
| 2009/0180777 A1* | 7/2009 | Bernard et al. | 398/68 |
| 2010/0125663 A1* | 5/2010 | Donovan | G06F 21/552 709/224 |
| 2011/0078311 A1* | 3/2011 | Nakashima | H04L 63/08 709/225 |
| 2011/0191847 A1* | 8/2011 | Davis | G06F 15/16 726/22 |
| 2012/0023593 A1* | 1/2012 | Puder | H04L 63/101 726/28 |
| 2012/0297042 A1* | 11/2012 | Davis | H04L 45/60 709/223 |
| 2013/0003720 A1* | 1/2013 | Tasker | H04L 65/1069 370/352 |
| 2013/0054948 A1* | 2/2013 | Raj | G06F 9/45558 713/2 |

FOREIGN PATENT DOCUMENTS

| | | |
|---|---|---|
| JP | 2012-205205 A | 10/2012 |
| JP | 2013-011949 A | 1/2013 |
| KR | 10-0656403 B1 | 12/2006 |
| KR | 10-2007-0003409 A | 1/2007 |
| KR | 10-2007-0073293 A | 7/2007 |
| KR | 10-2010-0111069 A | 10/2010 |
| KR | 10-2013-0034773 A | 4/2013 |

* cited by examiner

WHITELIST-BASED NETWORK SWITCH

CROSS REFERENCE TO RELATED APPLICATION

This application claims the benefit of Korean Patent Application No. 10-2013-0105326, filed on Sep. 3, 2013, which is hereby incorporated by reference in its entirety into this application.

BACKGROUND OF THE INVENTION

1. Technical Field

The present invention relates generally to a whitelist-based network switch and, more particularly, to a whitelist-based network switch, which defines a communication node and a communication rule permitted by a network switch as a whitelist, and generates an alarm or blocks the corresponding communication traffic when communication traffic violating the whitelist occurs.

2. Description of the Related Art

A network switch performs functions such as the configuration of a network topology, the use of a line, the detection of errors, and the transfer of frames, through a physical link. A typical network switch has various problems, such as a port mirroring security problem, the Address Resolution Protocol (ARP) cache poisoning problem of falsifying the Medium Access Control (MAC) address of an attacker, the hubbing-out problem of connecting a hub to a switch and being able to analyze a packet in a broadcast domain, the ARP spoofing problem of allowing an attacker to falsify a MAC address thereof, the Internet Control Message Protocol (ICMP) redirect problem of faking a gateway, and the switch jamming attack problem of making a buffer overflow attack in a cache space for the MAC table of a switch.

A security network switch introduced to solve such problems solves the security problem of typical network switches, controls all end-point nodes connected to the network, and provides functions such as a network status analysis function, a traffic monitoring function, an access control function, and a security function.

However, existing security network switches detect attacks based on a blacklist, thus making it impossible to cope with modified attacks not represented in the blacklist, zero-day attacks, and Advanced Persistent Threat (APT) attacks.

Network Access Control (NAC) technology, which is technology for checking the security state of devices accessing a network and permitting the access of only secure devices, is based on a scheme for installing a management program in the PC of a user, a server or other equipment. This NAC scheme cannot be used in an embedded system or a system in which a Programmable Logic Controller (PLC) or the like is installed.

Further, when additional equipment (tapping equipment) is used to monitor the traffic of an internal network, it is difficult to realistically manage such equipment due to high introduction cost and complicated line connections. Further, when a switch mirroring function is utilized, the mirroring function may apply a load to the network switch, thus hindering the stability of the switching function itself. Furthermore, there is a disadvantage in that when a cyber threat is detected, it is impossible to cope with the threat such as by intercepting the threat to guarantee the security of other equipment.

Therefore, the requirement for the development of network security equipment which can monitor and control internal network traffic without requiring additional equipment has been raised.

As related preceding technology, Korean Patent Application Publication No. 10-2007-0003409 (entitled "Security gateway system having an internal network user authentication and packet control function and operation method thereof") discloses technology which can apply respective security policies even to a plurality of final client PCs in an internal network, unlike existing security policies that were uniformly applied to the entire network, and which can isolate a defective client PC from neighboring client PCs and then perform stable network management.

As another preceding technology, Korean Patent Application Publication No. 10-2007-0073293 (entitled "Intrusion prevention system and method supporting multiple ports") discloses technology which can obtain considerable effects from the standpoint of performance, compared to a method using the address of packet headers, by applying different security policies based on the network ports of an Intrusion Prevention System (IPS), and which can apply different security policies to respective network ports and operate the security policies, thus enabling the network to be more flexibly managed.

As further preceding technology, Korean Patent No. 0656403 (entitled "Intrusion detection system in a network system") discloses technology which does not need to perform pattern matching after waiting for all packets fragmented for pattern matching to have arrived, and which performs pattern matching whenever each fragmented packet is received, thus reducing a load caused by the reassembly of fragmented packets, and shortening the time required to perform pattern matching on all packets, with the result that high-speed intrusion detection is possible.

SUMMARY OF THE INVENTION

Accordingly, the present invention has been made keeping in mind the above problems occurring in the prior art, and an object of the present invention is to provide a whitelist-based network switch, which defines a whitelist and a handling rule based on an access control list, security policies, etc., and monitors and blocks network traffic based on the whitelist and the handling rule.

In accordance with an aspect of the present invention to accomplish the above object, there is provided a whitelist-based network switch including a whitelist monitoring unit for storing a whitelist including permitted communication rules, monitoring one or more packets input through a plurality of switch interfaces based on the whitelist, and permitting communication of each packet conforming to the whitelist; and a whitelist management unit for updating the whitelist and transmitting an updated whitelist to the whitelist monitoring unit.

Preferably, the whitelist may include an Internet Protocol (IP) address permitted to be accessed by each of the plurality of switch interfaces, a Media Access Control (MAC) address permitted to be accessed by each switch interface, a MAC address capable of being mapped to a single IP address, a communication rule to be followed in communication using IP addresses or switch interfaces, and a communication rule to be followed in communication between MAC addresses.

Preferably, the communication rule to be followed in communication using the IP addresses or the switch interfaces may include a packet source IP address, a packet source port, a packet destination IP address, a packet destination port, information about whether to permit a request for a session connection from the packet source IP address to the packet destination IP address or a request for a session connection from the packet source port to the packet destination port, and a set of protocols usable upon transferring a packet from the packet source IP address to the packet destination IP address or from the packet source port to the packet destination port.

Preferably, the communication rule to be followed in communication using the IP addresses or the switch interfaces further may include an additional rule for a packet transferred from the packet source IP address to the packet destination IP address or from the packet source port to the packet destination port.

Preferably, the communication rule to be followed in communication between the MAC addresses may include a source hardware address, a destination hardware address, protocols permitted by the source hardware address and the destination hardware address, and a communication rule to be followed in transmission of packets by the source hardware address and the destination hardware address.

Preferably, the whitelist monitoring unit may be configured to, when a packet violating the whitelist occurs, generate an alarm or block the packet in conformity with a preset handling rule.

Preferably, the whitelist-based network switch may further include a traffic logging unit for creating a traffic log for the packets input through the plurality of switch interfaces, wherein the whitelist monitoring unit is configured to, with respect to packets conforming to the whitelist, record a number of packets or an amount of traffic generated per unit time in a policy log and, with respect to a packet violating the whitelist, record a corresponding traffic log and a number of a switch interface, through which the packet is input, in a violation log.

Preferably, the whitelist management unit may transfer the traffic log, the policy log, and the violation log to an external monitoring system.

Preferably, the whitelist-based network switch may further include a switch control unit for switching packets respectively input through the plurality of switch interfaces, transferring the packets to the whitelist monitoring unit, and performing a blocking operation in response to a control signal from the whitelist monitoring unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
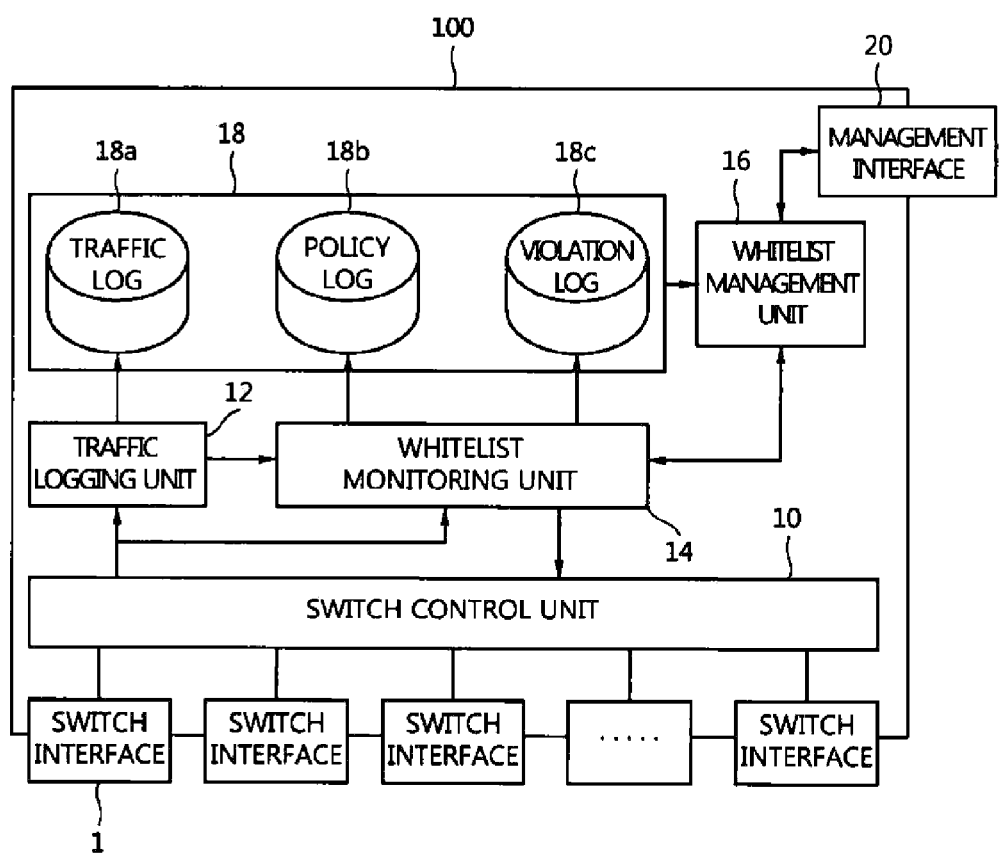
FIG. 1 is a diagram showing the configuration of a whitelist-based network switch according to an embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings for easy understanding of the overall invention and repeated descriptions of the same components will be omitted.

FIG. 1 is a diagram showing the configuration of a whitelist-based network switch according to an embodiment of the present invention.

A whitelist-based network switch 100 according to an embodiment of the present invention includes a switch control unit 10, a traffic logging unit 12, a whitelist monitoring unit 14, and a whitelist management unit 16.

The switch control unit 10 performs the function of switching packets that are input through respective switch interfaces 1. The network switch 100 may perform the function of managing the resources of a network, the function of monitoring an internal network, and a control function via the packet switch function of the switch control unit 10. In particular, an individual policy may be applied to each switch interface 1 (including the determination of whether to permit or block communication) by the switch control unit 10.

The switch control unit 10 may function to switch packets respectively input through the plurality of switch interfaces 1, transfer the packets to the whitelist monitoring unit 14, and perform a blocking operation in response to a control signal output from the whitelist monitoring unit 14.

The traffic logging unit 12 functions to receive the packets from the switch interfaces 1, which are switched by and input from the switch control unit 10, and create a traffic log 18a. The traffic log 18a is subsequently transferred to an external monitoring system and is used to automatically generate a whitelist, analyze accidents, and detect network status. Therefore, the traffic log 18a may take the form of required information so as to extract a whitelist to be used. The traffic logging unit 12 may extract, for example, a source Internet Protocol (IP) address, a source port, a destination IP address, a destination port, a protocol, etc. from the input packets in order to select information corresponding to the whitelist from the input packets. The information extracted by the traffic logging unit 12 (for example, the source IP address, the source port, the destination IP address, the destination port, the protocol, etc.) may be transferred to the whitelist monitoring unit 14 and may be used as basis data required to determine whether each packet violates the whitelist.

The whitelist described in the specification of the present invention may be understood to have a concept opposite to that of a blacklist in which a list, proved by a third party, of IP addresses or sites, spam mail, IP addresses used to distribute malicious code, false sites aggravating phishing, etc. are arranged into a database (DB).

The whitelist monitoring unit 14 previously stores a whitelist in which permitted communication nodes and permitted communication rules are defined. The whitelist monitoring unit 14 monitors one or more packets that are input through a plurality of switch interfaces 1 based on the whitelist, and permits the communication of packets conforming to the whitelist. In other words, the whitelist monitoring unit 14 receives packets input through the switch control unit 10, monitors the packets based on the whitelist, and records the number of packets or the amount of traffic generated per unit time, in a policy log 18b, with respect to packets corresponding to the whitelist (conforming to the whitelist). Further, with respect to each packet violating the whitelist, the whitelist monitoring unit 14 records the corresponding traffic log 18a and the number of the switch interface, through which the corresponding packet is input, in a violation log 18c. The whitelist monitoring unit 14 may determine whether the corresponding packet violates the preset whitelist, based on the information (for example, a source IP address, a source port, a destination IP address, a destination port, a protocol, etc.) extracted by the traffic logging unit 12.

The whitelist may be represented by "Whitelist: =($SP_{IP}$, $SP_{MAC}$, $IP_{MAC}$, AppRules, NetRules)". That is, the whitelist may be implemented as a set of five rules, that is, $SP_{IP}$, $SP_{MAC}$, $IP_{MAC}$, AppRules, and NetRules. Here, $SP_{IP}$ is defined as "$SP_{IP}$:=Set of (SwitchPort, IPSet)", and denotes IP addresses permitted to be accessed by each switch interface. $SP_{MAC}$ is defined as "$SP_{MAC}$: =Set of (SwitchPort, MACSet)", and denotes Medium Access Control (MAC) addresses permitted to be accessed by each switch interface. Here, SwitchPort denotes the corresponding switch interface of the whitelist-based network switch 100. Meanwhile, $IP_{MAC}$ is defined as "$IP_{MAC}$: =Set of (IP, MAC)", and denotes a MAC address that may be mapped to a single IP address. Furthermore, 'AppRules' denotes a communication rule that must be followed when communication is performed using IP addresses or the switch interfaces. Finally, 'NetRules' denotes communication rules that must be followed in communication between MAC addresses (a network layer protocol, for example, Address Resolution Protocol: ARP). The ARP denotes a protocol used to cause an IP address on the network to correspond to a physical network address.

Below, 'AppRules' will be described in greater detail. 'AppRules' may be represented by "AppRules:=Set of AppRule," where AppRule may be defined as "AppRule:= (SrcIPs, SrcPorts, DestIPs, DestPorts, SessionRequest, Protocol, ETCs)". That is, AppRule may be implemented as a combination of SrcIPs, SrcPorts, DestIPs, DestPorts, SessionRequest, Protocol, and ETCs. 'SrcIPs' denotes source IP addresses and may be regarded as indicating packet source IP addresses. 'SrcPorts' denotes source ports and may be regarded as indicating packet source ports. 'DestIPs' denotes destination IP addresses and may be regarded as indicating packet destination IP addresses. 'DestPorts' denotes destination ports and may be regarded as indicating packet destination ports. 'SessionRequest' indicates whether a request for a session connection from (SrcIP, SrcPort) to (DestIP, DestPort) has been permitted under the condition of SrcIP∈SrcIPs, SrcPort∈SrcPorts, DestIP∈DestIPs, and DestPort∈DestPorts. In other words, 'SessionRequest' indicates whether a request for a session connection from a packet source IP address to a packet destination IP address has been permitted or whether a request for a session connection from the packet source port to the packet destination port has been permitted. Here, if the session connection request has not been permitted, a request for a session connection from the packet source IP address or the packet source port to the packet destination IP address or to the packet destination port must not be made. Further, 'Protocol' denotes a protocol permitted to be used when a packet is transmitted from (SrcIP, SrcPort) to (DestIP, DestPort) under the condition of SrcIP∈SrcIPs, SrcPort∈SrcPorts, DestIP∈DestIPs, and DestPort∈Dest. In other words, 'Protocol' includes a set of protocols usable when a packet is transmitted from a packet source IP address to a packet destination IP address or from a packet source port to a packet destination port. By means of unapproved protocols, packets cannot be transmitted. Finally, 'ETCs' denotes additional rules (for example, the length of each packet, the length of data, bit per second (bps), pulse per second (pps), fragmentation information, the use of a Transmission Control Protocol (TCP) flag, etc.) for traffic that is transmitted from (SrcIP, SrcPort) to (DestIP, DestPort) under the condition of SrcIP∈SrcIPs, SrcPort∈SrcPorts, DestIP∈DestIPs, and DestPort∈Dest. In other words, 'ETCs' denotes additional rules for a packet that is transferred from a packet source IP address to a packet destination IP address or from a packet source port to a packet destination port. Since 'ETCs' is used only when there is a need to describe additional rules, it is a selective item.

Below, 'NetRules' will be described in greater detail. 'NetRules' may be represented by "NetRules:=Set of NetRule." Here, NetRule may be defined as "NetRule:=(SrcMACs, DestMACs, Protocol, ETCs)." That is, NetRule may be implemented as a combination of SrcMACs, DestMACs, Protocol, and ETCs. 'SrcMACs' denotes source MAC addresses, and may be regarded as indicating source hardware addresses (MAC addresses). 'DestMACs' denotes destination MAC addresses (Dest MAC addresses) and may be regarded as indicating destination hardware addresses. 'Protocol' denotes protocols permitted by SrcMACs and DestMACs. 'ETCs' denotes communication rules (for example, periodicity, bps, pps, etc.) to be followed when packets are transmitted by SrcMACs and DestMACs.

Meanwhile, the whitelist monitoring unit 14 may transfer prevention rules for the violating traffic (that is, one or more packets; a bundle of packets) to the switch control unit 10, thus allowing the traffic to be blocked (this may be regarded as the blocking of each packet). That is, when a packet violating the whitelist occurs, the whitelist monitoring unit 14 generates an alarm against the packet or blocks the packet in conformity with a preset handling rule. Here, the preset handling rule includes details, such as the generation of an alarm, the blocking of a specific switch interface, the blocking of a specific IP address, the blocking of a specific MAC address, the cutoff of a specific data flow (that is, the cutoff of a data flow from a specific source IP address to a specific destination IP address and the cutoff of a data flow from a specific source port to a specific destination port), and the disconnection of a specific session (that is, the disconnection of a session from a specific source IP address to a specific destination IP address and the disconnection of a session from a specific source port to a specific destination port). By means of this rule, the whitelist monitoring unit 14 performs detailed monitoring and communication control such as the generation of an alarm, the blocking of a specific switch interface, or the blocking of a specific IP address, depending on which of permitted communication rules included in the whitelist has been violated.

In this way, when a packet violating the whitelist occurs, the whitelist monitoring unit 14 may set a separate handling rule depending on the violated whitelist rule (that is, this may be implemented as a set of five rules, that is, $SP_{IP}$, $SP_{MAC}$, $IP_{MAC}$, AppRules, and NetRules) and the corresponding packet information.

In FIG. 1, although the traffic logging unit 12 and the whitelist monitoring unit 14 are shown as separate components, it is possible to allow the traffic logging unit 12 to be contained in the whitelist monitoring unit 14. If the traffic logging unit 12 is contained in the whitelist monitoring unit 14, the function of the traffic logging unit 12 will be performed by the whitelist monitoring unit 14.

The whitelist management unit 16 receives externally generated and revised whitelists and transmits the whitelists to the whitelist monitoring unit 14. In other words, the whitelist management unit 16 takes charge of the function of transferring the whitelists to the whitelist monitoring unit 14 and the function of transferring a traffic log 18a, a policy log 18b, and a violation log 18c to an external monitoring system (not shown) through a management interface 20. The external monitoring system uses the received logs to analyze accidents, detect the status of a network, and generate and revise whitelists. Of course, it is also possible for the whitelist management unit 16 to analyze accidents, detect the status of the network, and generate and revise whitelists using the logs.

The individual logs (traffic log 18a, policy log 18b, and violation log 18) of a log unit 18 are used to allow the external management system (not shown) connected to the management interface 20 to generate and manage whitelists, analyze accidents, and analyze environmental variations, and are also used for external control.

Existing network switches are disadvantageous in that traffic logs of all traffic cannot be created due to the limited performance of hardware. However, in accordance with the above-described embodiment of the present invention, information about packets passing through the switch interfaces 1 is logged, and then a policy may be determined depending on the relationship of access to the network based on the logged information. Here, the determination of the policy may be regarded as determining whether to permit or block communication.

Figure 2:
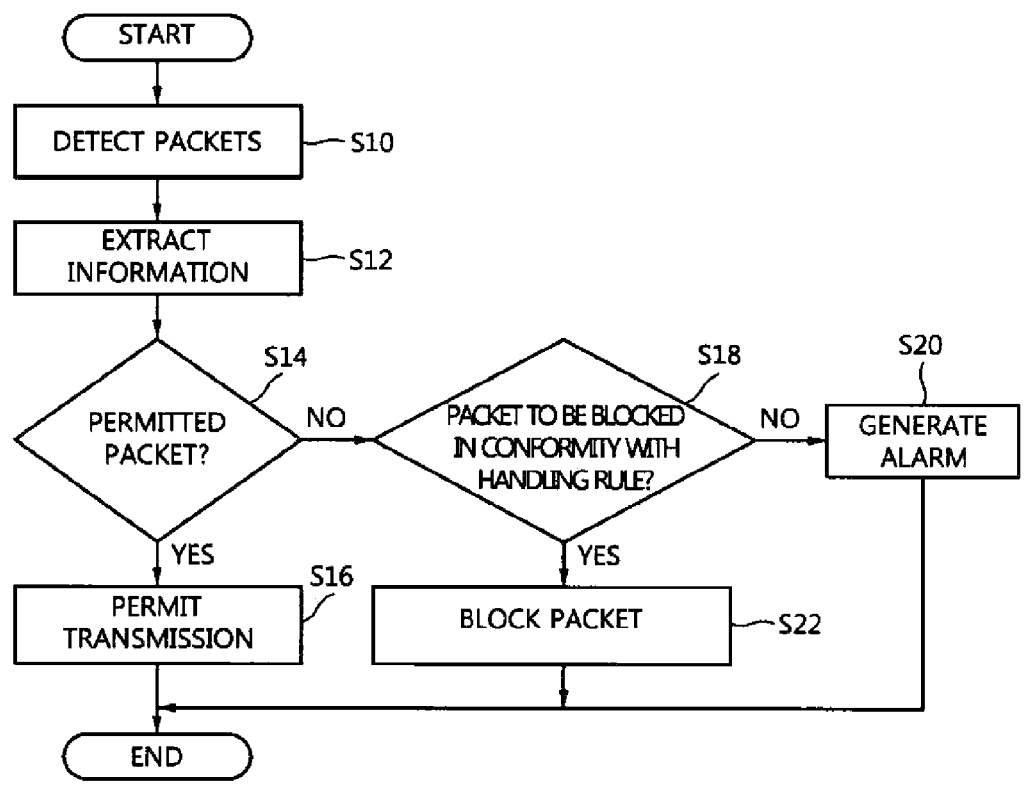
FIG. 2 is a flowchart showing the operation of the whitelist-based network switch according to an embodiment of the present invention.

FIG. 2 is a flowchart showing the operation of the whitelist-based network switch according to an embodiment of the present invention.

When a specific host attempts to access the whitelist-based network switch 100, the traffic logging unit 12 detects input packets via the switch control unit 10 at step S10.

Then, the traffic logging unit 12 extracts information corresponding to a whitelist (for example, a source IP address, a source port, a destination IP address, a destination port, a protocol, etc.) from the input packets at step S12.

Thereafter, the whitelist monitoring unit 14 receives the information (for example, the source IP address, the source port, the destination IP address, the destination port, the protocol, etc.) from the traffic logging unit 12, and determines whether each packet is a packet violating the whitelist or a permitted packet, based on each pre-stored whitelist, at step S14.

As a result of the determination, if the packet is the permitted packet, the transmission of the packet is permitted at step S16.

In contrast, if the packet is not a permitted packet (No at step S14), the whitelist monitoring unit 14 determines whether to block the packet in conformity with the handling rule at step S18.

As a result of the determination, if an alarm needs to be generated in conformity with the handling rule, the whitelist monitoring unit 14 generates an alarm at step S20. Here, even if a detailed description of the generation of an alarm is not made here, it may be sufficiently understood by those skilled in the art from well-known technology related to the generation of an alarm.

Meanwhile, if the packet needs to be blocked in conformity with the handling rule, the whitelist monitoring unit 14 performs a blocking operation (for example, the blocking of a switch interface, the blocking of a permitted device, the disconnection of a service, or the like) by controlling the switch control unit 10 at step S22.

Figure 3:
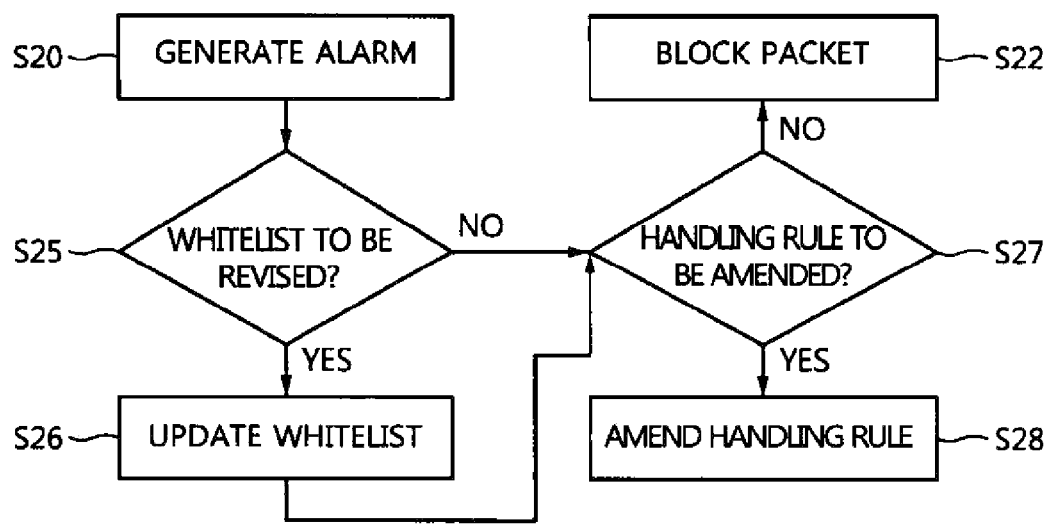
FIG. 3 is a flowchart showing a processing method when an alarm is generated and a blocking operation occurs in FIG. 2.

FIG. 3 is a flowchart showing a processing method when an alarm is generated and a blocking operation occurs, as shown in FIG. 2.

After the alarm has been generated, it is determined whether to revise the whitelist at step S25. That is, since the corresponding packet by which the alarm is generated violates the preset whitelist, the whitelist monitoring unit 14 generates an alarm. However, the corresponding packet by which the alarm is generated may be a packet to be included in a whitelist even if it is not currently included in the preset whitelist. Therefore, if the packet must be included in the whitelist, the whitelist needs to be revised.

Whether to revise the whitelist is determined by a manager. If it is determined by the manager that the whitelist is to be revised, the manager transmits a signal corresponding to the revision and information to be revised to the whitelist management unit 16.

Accordingly, the whitelist management unit 16 updates the whitelist based on the received information to be revised at step S26. The whitelist updated in this way is transferred to the whitelist monitoring unit 14.

Thereafter, the manager determines whether to amend the handling rule at step S27. If it is determined to amend the handling rule, the manager transmits information indicating how the handling rule is to be amended to the whitelist management unit 16.

Accordingly, the whitelist management unit 16 amends the handling rule based on the input information at step S28. The handling rule amended in this way is transferred to the whitelist monitoring unit 14.

In accordance with the present invention having the above configuration, network traffic may be monitored based on a whitelist, and an alarm may be generated against traffic violating the whitelist or, alternatively, the corresponding traffic may be blocked.

The present invention has a network switch function, so that the function of managing network resources, the function of monitoring an internal network, and a control function may be performed while a packet switch function is performed.

In the present invention, a whitelist may represent network access control, host access control, specific switch interface control, application-level communication rules, etc. by using permitted devices (physical address: MAC, IP, switch interface, etc.), permitted services (TCP, User Datagram Protocol (UDP), communication protocol, service port, etc.), permitted connections (sessions), etc., thus representing and managing the characteristics of a network to be monitored.

Further, the present invention may detect cyber attacks without blacklist information, by monitoring a network based on a whitelist, thus generating an alarm against traffic violating the whitelist or blocking the corresponding traffic depending on conditions.

Furthermore, a correlation between pieces of equipment connected to the network and the properties of the equipment may be detected.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A computer-implemented whitelist-based network switch comprising:
   at least one non-transitory storage device;
   a processor;
   executing by the processor using programs and the at least one non-transitory storage device one or more units where one or more units comprise:
   a whitelist monitoring unit for storing a whitelist including permitted communication rules, monitoring one or more input packets through a plurality of switch interfaces based on the whitelist, and determining, by the processor, communication of each packet whether or not conforming to the whitelist;
   in response to determination that the communication of each packet being conformed to the whitelist,
   a traffic logging unit for creating a traffic log for the input packets through the plurality of switch interfaces, wherein the whitelist monitoring unit is configured to, with respect to packets conforming to the whitelist, record a number of packets or an amount of traffic generated per unit time in a policy log and,
   in response to determination that the communication of each packet not being conformed to the whitelist,
   the white monitoring unit for recording a corresponding traffic log with respect to a packet violating the whitelist, and a number of a switch interface, through which the packet is input, in a violation log, wherein the whitelist monitoring unit is configured to, when a packet violating the whitelist occurs, generate an alarm or block the packet in conformity with a preset handling rule;
   a switch control unit for switching packets respectively input through the plurality of switch interfaces, transferring the packets with respect to a packet violating the whitelist, to the whitelist monitoring unit, and performing a blocking operation in response to a control signal with respect to a packet violating the whitelist from the whitelist monitoring unit;
   a whitelist management unit for updating the whitelist and transmitting an updated whitelist to the whitelist monitoring unit, wherein
   the determination whether or not the communication of each packet being conformed to the whitelist is performed, by the processor according to the traffic log, policy log, and violation log that are configured to generate the whitelist, wherein the traffic log, policy log, and violation log are different from each other, and
   by extracting information corresponding to the whitelist, the extracted information comprising at least one of a source Internet Protocol (IP) address, a source port, a destination IP address, a destination port, and a protocol from the input packets, and the extracted information is transferred to the white monitoring unit, and wherein
   the whitelist includes an Internet Protocol (IP) address permitted to be accessed by each of the plurality of switch interfaces, a Media Access Control (MAC) address permitted to be accessed by each switch interface, a MAC address configured to be mapped to a single IP address, a communication rule to be followed in communication using IP addresses or switch interfaces, and a communication rule to be followed in communication between MAC addresses.

2. The whitelist-based network switch of claim 1, wherein the communication rule to be followed in communication using the IP addresses or the switch interfaces includes a packet source IP address, a packet source port, a packet destination IP address, a packet destination port, information about whether to permit a request for a session connection from the packet source IP address to the packet destination IP address or a request for a session connection from the packet source port to the packet destination port, and a set of protocols usable upon transferring a packet from the packet source IP address to the packet destination IP address or from the packet source port to the packet destination port.

3. The whitelist-based network switch of claim 2, wherein the communication rule to be followed in communication using the IP addresses or the switch interfaces further includes an additional rule for a packet transferred from the packet source IP address to the packet destination IP address or from the packet source port to the packet destination port.

4. The whitelist-based network switch of claim 1, wherein the communication rule to be followed in communication between the MAC addresses includes a source hardware address, a destination hardware address, protocols permitted by the source hardware address and the destination hardware address, and a communication rule to be followed in transmission of packets by the source hardware address and the destination hardware address.

5. The whitelist-based network switch of claim 1, wherein the whitelist management unit transfers the traffic log, the policy log, and the violation log to an external monitoring system.

* * * * *